United States Patent
Ueda

(10) Patent No.: US 9,515,477 B2
(45) Date of Patent: Dec. 6, 2016

(54) OVERCURRENT PROTECTION DEVICE, OVERCURRENT PROTECTION METHOD, AND NON-TRANSITORY MEDIUM

(71) Applicant: Kazuhiko Ueda, Seto (JP)

(72) Inventor: Kazuhiko Ueda, Seto (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 338 days.

(21) Appl. No.: 14/138,245

(22) Filed: Dec. 23, 2013

(65) Prior Publication Data

US 2014/0177119 A1  Jun. 26, 2014

(30) Foreign Application Priority Data

Dec. 25, 2012 (JP) .................. 2012-281555

(51) Int. Cl.
| | |
|---|---|
| H02H 9/02 | (2006.01) |
| H02H 3/04 | (2006.01) |
| H02H 3/08 | (2006.01) |
| B60L 3/00 | (2006.01) |
| B60L 7/16 | (2006.01) |
| B60L 11/12 | (2006.01) |

(52) U.S. Cl.
CPC .............. *H02H 3/046* (2013.01); *B60L 3/0069* (2013.01); *B60L 7/16* (2013.01); *B60L 11/123* (2013.01); *H02H 3/085* (2013.01); *Y02T 10/6217* (2013.01); *Y02T 10/7077* (2013.01)

(58) Field of Classification Search
USPC .............................. 361/93.7–93.9, 103, 104
See application file for complete search history.

(56) References Cited

U.S. PATENT DOCUMENTS

| | | |
|---|---|---|
| 6,661,633 B1 | 12/2003 | Furuta et al. |
| 2007/0064370 A1 | 3/2007 | Kajiwara |
| 2011/0019326 A1* | 1/2011 | Odaohhara ........... H02J 7/0031 361/104 |

FOREIGN PATENT DOCUMENTS

| | | |
|---|---|---|
| JP | 61-111159 U | 7/1986 |
| JP | H07-99784 A | 4/1995 |
| JP | 2001-052903 A | 2/2001 |
| JP | 2004-153944 A | 5/2004 |
| JP | 2007-082036 A | 3/2007 |
| JP | 2010-040282 A | 2/2010 |

* cited by examiner

*Primary Examiner* — Danny Nguyen
(74) *Attorney, Agent, or Firm* — Dinsmore & Shohl LLP

(57) ABSTRACT

An overcurrent protection device includes a fuse element and an auxiliary circuit. Power is applied from a high-voltage unit of a main circuit to the fuse element. The auxiliary circuit includes a component which heats the fuse element. An amount of electric current flowing in the fuse element when the fuse element melts is controlled by heat generated by the component.

15 Claims, 6 Drawing Sheets

OVERCURRENT PROTECTION DEVICE, OVERCURRENT PROTECTION METHOD, AND NON-TRANSITORY MEDIUM

INCORPORATION BY REFERENCE

The disclosure of Japanese Patent Application No. 2012-281555 filed on Dec. 25, 2012 including the specification, drawings and abstract is incorporated herein by reference in its entirety.

BACKGROUND OF THE INVENTION

1. Field of the Invention

The invention relates to an overcurrent protection device, an overcurrent protection method, and a non-transitory medium for preventing, by fuse blowing, the occurrence of component or circuit failure caused by overcurrent.

2. Description of Related Art

A technique using a fuse for protecting a circuit including a passive component such as an insulated gate bipolar transistor (IGBT), a metal-oxide-semiconductor field-effect transistor (MOSFET), and a resistor is disclosed, for example, in the below-described Japanese Patent Application Publication No. 2004-153944 (JP 2004-153944 A).

In such a device, a separate semiconductor device is provided for grounding the fuse, and the fuse is itself blown by overcurrent, thereby protecting the component or circuit. Therefore, a failure can be caused by the sputtering of the blown fuse.

SUMMARY OF THE INVENTION

The invention provides an overcurrent protection device, an overcurrent protection method, and a non-transitory medium that can adequately protect a circuit, without causing a failure induced by a blown fuse.

According to a first aspect of the invention, an overcurrent protection device includes: a fuse element to which power is applied from a high-voltage unit of a main circuit; and an auxiliary circuit including a component which heats the fuse element. An amount of electric current flowing in the fuse element when the fuse element melts is controlled by heat generated by the component. The component may be constituted by a first component and a second component adjacent to each other. Further, the fuse element may be disposed between the first component and the second component. The overcurrent protection device may also include a control substrate having a surface where the first component, the second component, and the fuse element are provided. The overcurrent protection device may also include a heat transfer plate provided in the control substrate and thermally connecting the surfaces of the first component, the second component, and the fuse element that face the surface of the control substrate. The heat transfer plate may be a connection plate that electrically connects the first component and the second component to each other.

According to a second aspect of the invention, an overcurrent protection device includes: a discharge unit, a detection unit, a first control unit, a power supply circuit, a fuse element, and an application unit. The discharge unit discharges electric charges of a high-voltage unit of a main circuit. The detection unit detects an energizing current of the discharge unit. The first control unit controls the discharge unit. The power supply circuit includes a power supply component that supplies power to the first control unit on a basis of power from the high-voltage unit. The fuse element is applied with power from the high-voltage unit of the discharge unit. The application unit performs an application of the power from the high-voltage unit between main terminals of the power supply component so as to heat the fuse element in the case where the detection unit detects the energizing current when the first control unit maintains OFF control of the discharge unit.

The application unit may be configured to gradually increase an amount of the application. The application unit may be configured to stop the application when the detection unit does not detect the energizing current after the application unit has performed the application. The overcurrent protection device may further include a notification unit that, when the application performed by the application unit is stopped, notifies a second control unit, which is configured to notify a user of melting of the fuse element, of information including the occurrence of melting of the fuse element caused by the application.

The overcurrent protection device may further include a control substrate. The control substrate has a surface on which the power supply component and the fuse element are adjacently mounted. The first control unit, the detection unit, and the application unit may constitute a single integrated circuit. The integrated circuit is mounted on the control substrate. The power supply component may be constituted by a first component and a second component adjacent to each other. The fuse element may be disposed between the first component and the second component. The overcurrent protection device may further include a heat transfer plate. The heat transfer plate is provided in the control substrate and thermally connects the surfaces of the power supply component and the fuse element that face the surface of the control substrate. The heat transfer plate may be a connection plate that electrically connects the first component and the second component to each other.

According to a third aspect of the invention, an overcurrent protection method includes: a detection step of detecting an energizing current in a discharge resistor when a control unit stops discharge to the discharge resistor, the control unit controlling discharge of electric charges of a high-voltage unit of a main circuit; and an application step of, when the energizing current has been detected in the detection step, heating a fuse element disposed at a high-voltage side of the discharge resistor by performing an application of power from the high-voltage unit between main terminals of a power supply component, the power supply component supplying power to the control unit on a basis of power from the high-voltage unit. According to a fourth aspect of the invention, a non-transitory medium stores a program for executing the overcurrent protection method.

In accordance with the aspects of the invention, the fuse element is heated by heat generated by application of power to the component of the auxiliary circuit, or to the power supply component of the power supply circuit, and the energizing current that is required to flow in the fuse element in order to melt the fuse element can be reduced. Therefore, the circuit positioned on the grounding side with respect to the fuse element in the main circuit can be adequately protected.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The embodiments of the invention are described hereinbelow with reference to the appended drawings.

Figure 1:
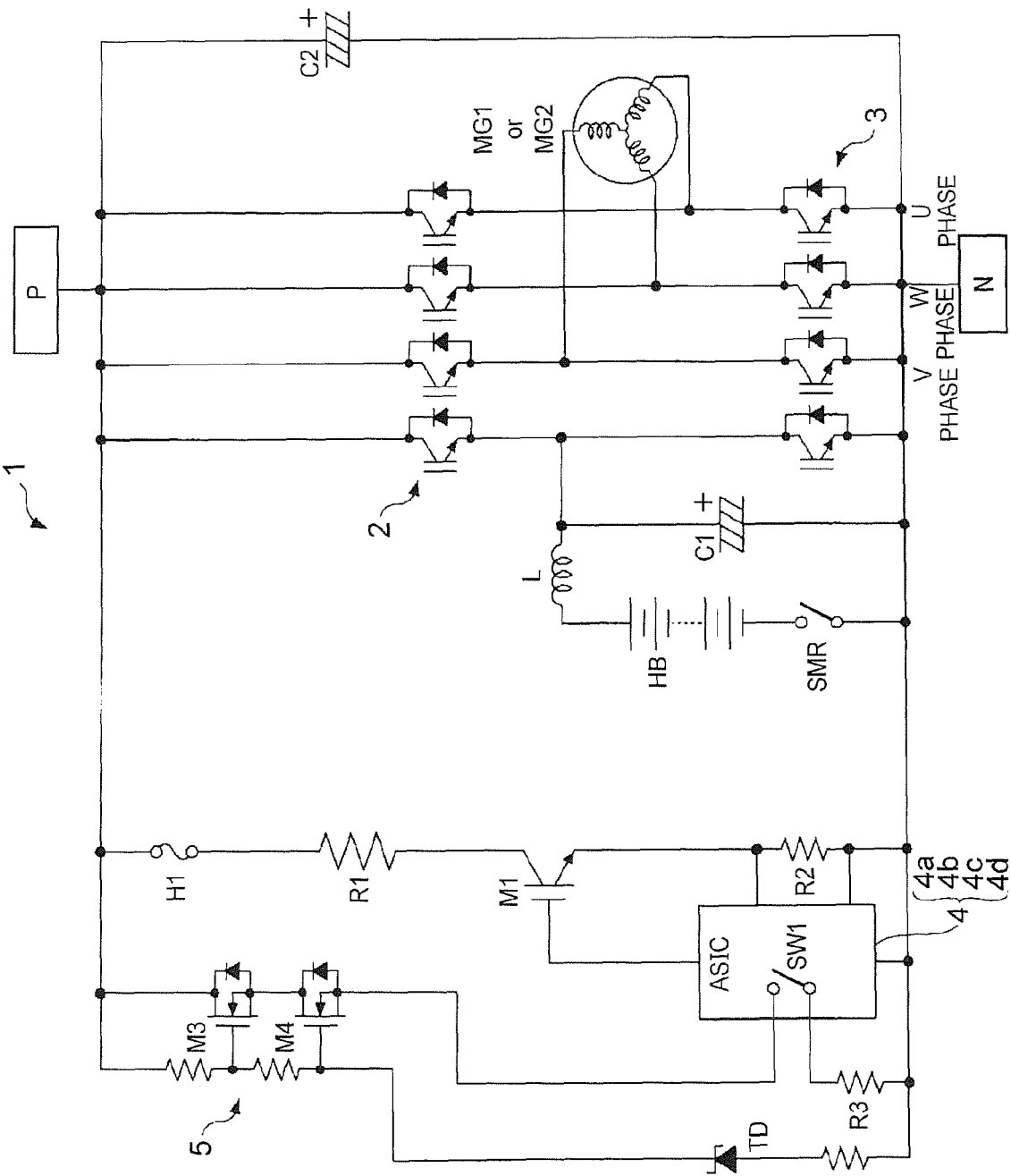
FIG. 1 is a schematic diagram illustrating an embodiment of the overcurrent protection device 1 which is an example of the invention.

As shown in FIG. 1, an overcurrent protection device 1 of the present example includes a converter 2, a discharge IGBTM1 (discharge unit), a discharge resistor R1, a detection unit 4a, and a control unit 4b. The converter 2 constitutes a main circuit. The discharge IGBTM1 discharges electric charges of a high-voltage unit P of the inverter 3. The detection unit 4a detects the leak current (energizing current) of the discharge IGBTM1 with a discharge detection resistor R2. The control unit 4b controls ON/OFF switching of the discharge IGBTM1.

The overcurrent protection device 1 also includes power supply components M3, M4 (components), a power supply circuit 5 (auxiliary circuit), and a fuse H1 (fuse element). The power supply components M3, M4 (components) supply electric power to the control unit 4b on the basis of power from the high-voltage unit P. The control unit 4b may be considered as the first control unit of the invention. The power supply circuit 5 includes a Zener diode TD and a resistor R3 for heat generation control. The fuse H1 is disposed on the high-voltage side of the discharge IGBTM1 and the discharge resistor R1.

Further, the overcurrent protection circuit 1 also includes an application unit 4c. Where the detection unit 4a detects a leak current (energizing current) when the control unit 4b does not switch ON the discharge IGBTM1, the discharge IGBTM1 is assumed to have an ON failure. In this case, the application unit 4c applies power from the high-voltage unit P between the main terminals of the power supply components M3, M4 so as to heat the fuse H1.

The main circuit including the converter 2 and the inverter 3 shown in FIG. 1 controls motor generators MG1, MG2, for example, on the basis of control of a motor generator electronic control unit (MGECU) (may be another control unit, a hybrid vehicle electronic control unit (HVECU)) (not shown in the figure) for a hybrid vehicle. The MGECU may be considered as the second control unit of the invention. The main circuit boosts the voltage of a high-voltage battery HB with a smoothing circuit including a filter capacitor C1 and a reactor L, and two IGBT of the converter 2. The main circuit converts the boosted voltage of a smoothing capacitor C2 into U, V, and W phases by six respective IGBT of the inverter 3. In addition, the main circuit performs drive control by supplying the power converted into the U, V, and W phases to the motor generators MG1, MG2. During regenerative braking, the main circuit performs power conversion in the reverse direction and charges the high-voltage battery HB. A system main relay SMR is disposed at the grounding side of the high-voltage battery HB.

In this case, the detection unit 4a, the control unit 4b, and the application unit 4c constitute a single application specific integrated circuit (ASIC) 4. The ASIC designates a type of an electronic component and is a general name for an integrated circuit in which circuits with a plurality of functions designed for specific applications are combined together. The ASIC 4 typically includes digital circuits, but may also include an analog circuit. In the present configuration, the SW1 for heat generation control that functions as a final output unit of the application unit 4c is constituted by semiconductor devices on a digital circuit, but it may also be constituted by relays of analog circuits. In the present example, the resistor R3 for heat generation control is a type of a register that can be externally attached to the ASIC 4 thereby facilitating the adjustment.

In the power supply circuit 5, the constituent components are configured as described hereinbelow. The emitter of the power supply component M3 and the collector of the power supply component M4 are connected in series. The emitter of the power supply component M4 is connected in series with the switch SW1 for power generation control and the resistor R3 for power generation control. A voltage that has been lowered by a two-stage step-down resistor is applied to the bases which are the control terminals of the power supply components M3, M4. The Zener diode TD is connected in series with the two-stage step-down resistor. The power supply circuit 5 is the so-called series power supply that converts the high voltage of the high-voltage unit P into a low voltage suitable for the operation of the ASIC 4 and outputs the converted voltage. The number of stages of the power supply components is set on the basis of heat capacity of each component determined according to the degree of voltage decrease and may be other than two.

In this configuration, the application unit 4c gradually increases the duty ratio of the switch SW1 for heat generation control and thus gradually increases the amount of power applied between the main terminals of the power supply components M3, M4. Further, when no leak current is detected by the detection unit 4a after the power application, the application unit 4c determines that the fuse H1 is blown and stops the application of power. The ASIC 4 also includes a notification unit 4d that notifies, following the application of power being stopped, the MGECU, which is the control unit other than the control unit 4b, that the fuse H1 is blown as a result of the application and that the discharge with the discharge IGBTM1 is impossible.

Figure 2A:
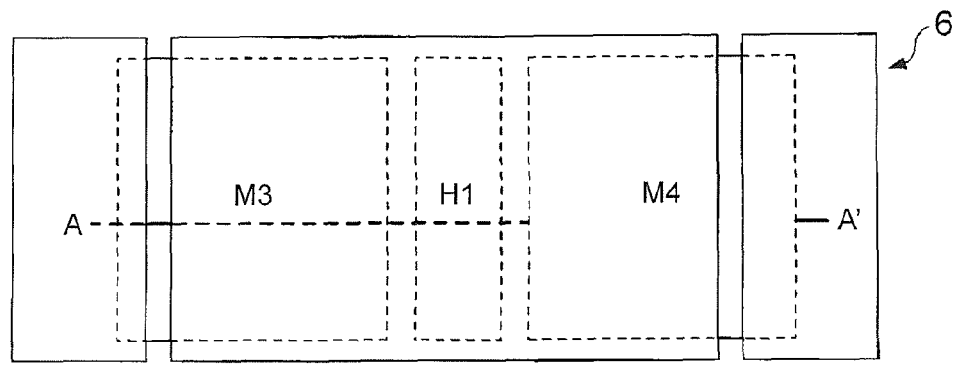
FIGS. 2A and 2B are schematic diagrams illustrating the power supply components and fuse which are mounted on the overcurrent protection device 1 of the example.
Figure 2B:
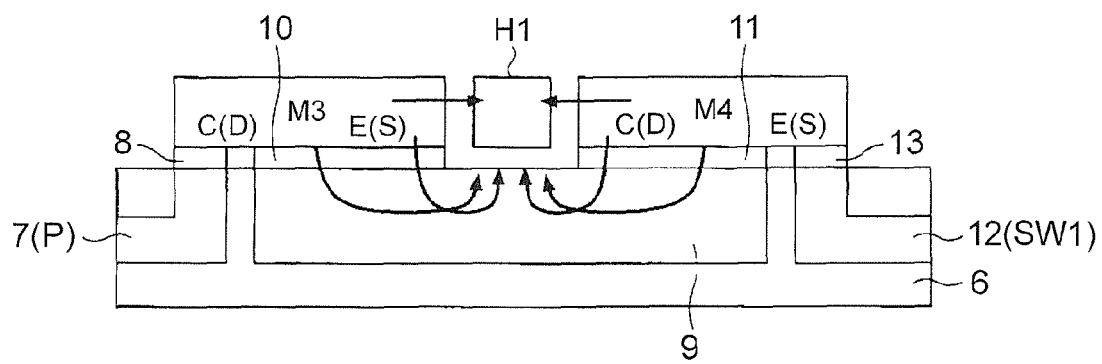

Further, in the present example, as shown in the front view of a control substrate 6 in FIG. 2A, the power supply components M3, M4 and the fuse H1 are adjacently mounted on the surface of the control substrate 6 on which the ASIC 4 is to be mounted. In this case, the fuse H1 of a surface-mounted type is selected. The control substrate 6 may be, for example, a glass-epoxy substrate. Further, in the present example, the power supply surface 5 includes two, that is, a plurality of, power supply components M3, M4. As shown in FIG. 2B, which is an AA cross section of FIG. 2A, the fuse H1 is disposed to be interposed between the adjacent power supply components M3, M4.

As shown in FIG. 2B, a collector C of the power supply component M3 on the high-voltage unit P side is electrically connected by a solder joint 8 to a copper wiring 7. An emitter E of the power supply component M3 is electrically and thermally connected by a solder joint 10 to the front surface of a copper wiring 9 on the high-voltage unit P side. A collector C of the power supply component M4 is electrically and thermally connected by a solder joint 11 to the front surface of the copper wiring 9 on the side of the switch SW1 for heat generation control. An emitter E of the power supply component M4 on the side of the switch SW1 for heat generation control is electrically connected by a solder joint 13 to a copper wiring 12.

Thus, in the present example, the copper wiring 9 in the control substrate 6 constitutes a thermally conductive plate thermally connecting the power supply components M3, M4 and the rear surface side of the fuse H1. The copper wiring 9 also serves as a connection plate that electrically connects the power supply components M3, M4 to each other. The copper wiring 7 and the copper wiring 9 are disposed at a distance from each other in the control substrate 6 and are insulated from each other. The copper wiring 9 and the copper wiring 12 are disposed at a distance from each other in the control substrate 6 and are insulated from each other. Since the fuse H1 is disposed in a gap, in the left-right direction in FIG. 2B, between the power supply components M3, M4, the fuse H1 is heated not only by heat conduction from the rear surface via the copper wiring 9, but also by radiation heat from the side surface of the power supply component M3 and the side surface of the power supply component M4.

Figure 2C:
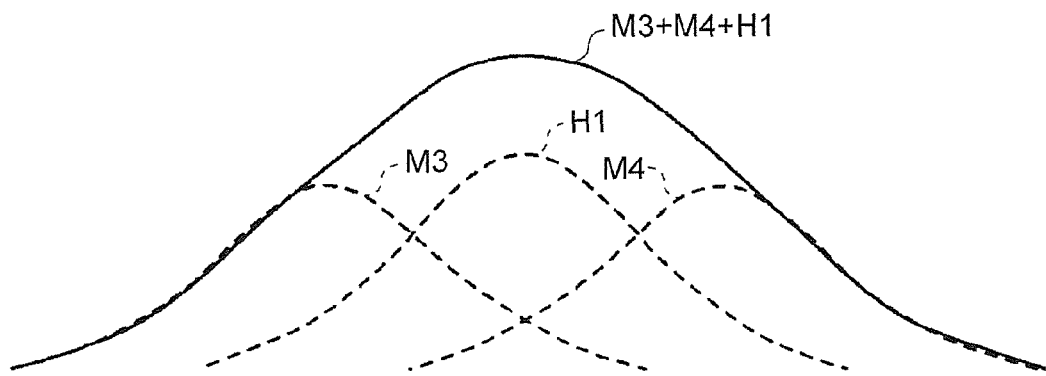
FIG. 2C is a schematic diagram illustrating the heat distribution of the power supply components and fuse of the overcurrent protection device 1 of the example.

As shown in FIG. 2C, the heat distribution of the power supply component M3 and the heat distribution of the power supply component M4 in the AA cross section in FIG. 2B are represented by broken-line curves that are convex upward. A combined heat distribution obtained by combining the heat distributions of the power supply components M3, M4 and the fuse H1 is represented by a solid-line curve having a peak between the heat distributions of the power supply components M3, M4 in the left-right direction. The heat distribution of the fuse H1 that is generated by actual heating of the fuse H1 resulting from the combined heat distribution is less by a heat transfer ratio Y (<1) than the combined heat distribution.

Figure 3:
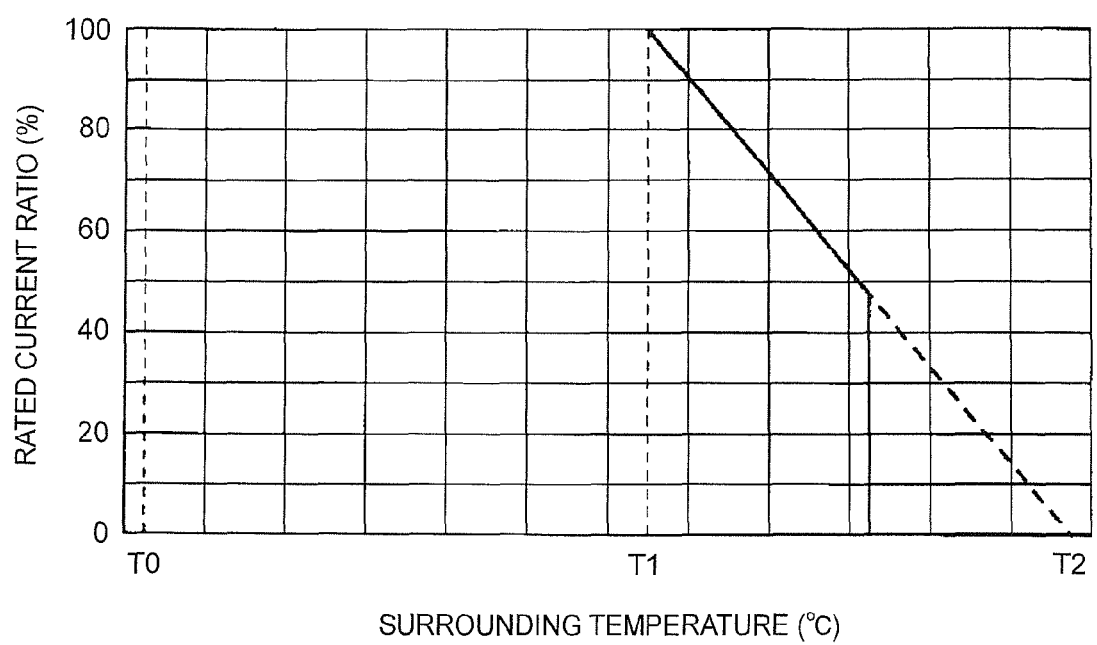
FIG. 3 is a schematic diagram illustrating the correlation between the surrounding temperature and rated current ratio of the fuse of the overcurrent protection device 1 of the example.

The condition required for heating and melting the fuse H1 is described below. Where the surrounding temperature (° C.) is plotted on the abscissa and the rated current ratio (%) is plotted on the ordinate, as shown in FIG. 3, the fuse H1 has properties such that the rated current ratio is maintained at 100% in a range from the surrounding temperature T0 to T1 (>T0), and the rated current ratio gradually decreases to 0% from in a range from T1 to T2 (>T1).

Thus, by heating the fuse H1 with the power supply components M3, M4 up to the surrounding temperature T2 at which the rated current ratio becomes 0%, it is possible to blow the fuse H1 by a very small leak current caused by the ON failure of the discharge IGBTM1.

Where the thermal resistance of the power supply components M3, M4 is denoted by X (° C./W) and the transfer ratio relating to heat transfer to the fuse H1 by thermal conduction and radiation from the power supply components M3, M4, which are the heat sources, is denoted by Y, the necessary consumed power is $Z=(T2-T1)/X/Y$ (W). The voltage of the ASIC 4, the resistor R3 for heat generation control, and the transfer ratio Y are set such that consumed power of the ASIC 4 is within a range in which the ASIC functions are not lost due to the heat. The consumed power of the ASIC 4 is obtained by multiplying the voltage of the ASIC 4 by the current obtained by dividing the consumed power Z by the voltage of the power supply components M3, M4.

The control contents of the ASIC 4 of the overcurrent protection device 1 of the above-described present example is explained below by using the flowchart shown in FIG. 4. As shown in step S1, the detection unit 4a of the ASIC 4 monitors the voltage between the terminals of the resistor R2 for discharge detection in a state in which the ON signal is not applied to the base of the discharge IGBTM1, that is, in a state in which the OFF control is maintained. Then, the control unit 4b of the ASIC 4 determines, on the basis of the monitoring result of the detection unit 4a, whether or not a leak current flows between the collector and emitter of the discharge IGBTM1, that is, whether or not "the leak is present".

In the case of Yes in step S1, the processing flow advances to step S2, and in the case of No, the processing flow returns to before step S1. In step S2, the application unit 4c of the ASIC 4 switches ON the switch SW1 for power generation control so that the power from the high-voltage unit P side is applied between the collector of the power supply component M3 and the emitter of the power supply component M4 and heat is generated. After the heat generation treatment of step S2, that is, in step S3, the ASIC 4 determines whether or not "the leak is present" in the same manner as in step S1 and, as long as the determination is positive, continues step S2. Where the determination is negative, the processing advances to step S4.

In step S4, the application unit 4c of the ASIC 4 switches OFF the switch SW1 for heat generation control and stops the application of power to the power supply components M3, M4 so as to stop heat generation. Then, in step S4, the notification unit 4d of the ASIC 4 transmits "information indicating that the fuse H1 has melted (is blown) and that the discharge is impossible" to the aforementioned MGECU.

Figure 4:
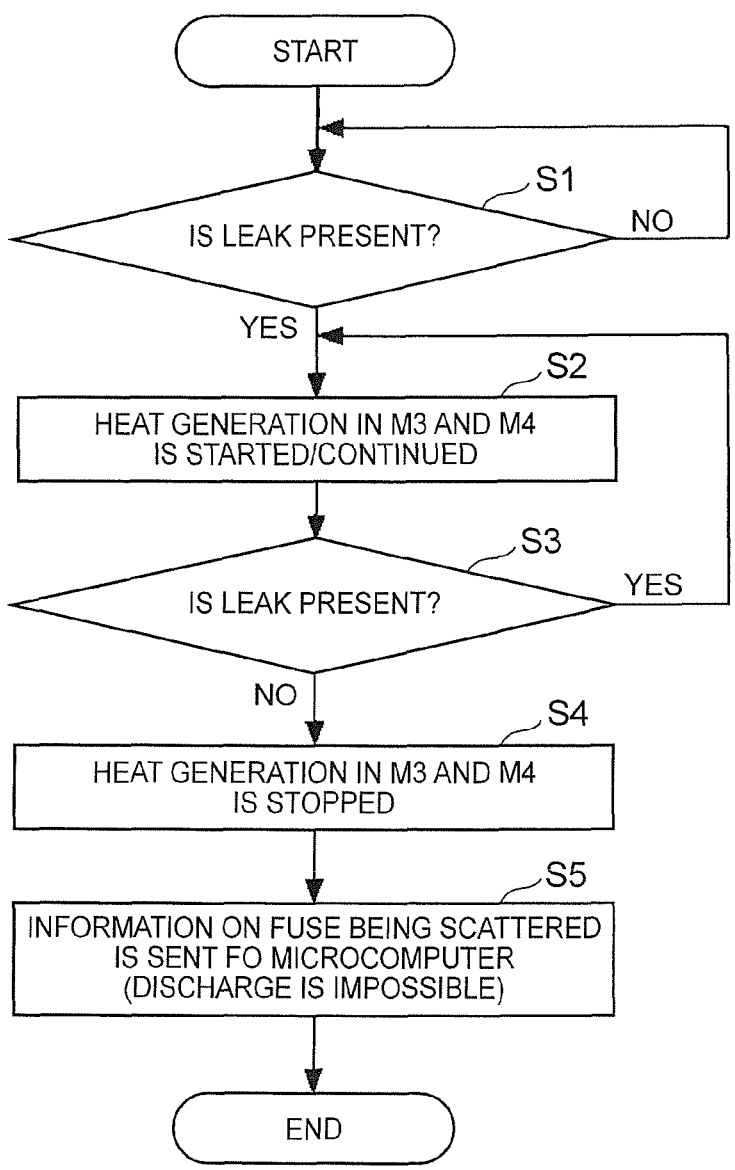
FIG. 4 is a flowchart illustrating the control contents of the overcurrent protection device 1 of the example.

The overcurrent protection method of the present example is repeatedly executed by repeatedly executing the flowchart shown in FIG. 4 from START to END. Further, the ASIC 4 includes a medium storing the program of the present example.

The following operation effects can be obtained with the overcurrent protection device 1 and the overcurrent protection method of the above-described example. The leak current generated when an ON failure has occurred in the discharge IGBTM1 is detected and power is applied to the power supply components M3, M4, thereby gradually raising the temperature around the fuse 111 to T2 shown in FIG. 3. As a result, the fuse H1 can be caused to blow by a small leak current. The amount of current that can flow in the fuse, in other words, the amount of current necessary to cause the fuse to blow, is changed by heat generation by the components. Thus, the aforementioned amount of current is controlled on the basis of the amount of heat generated by the components. As a result, the discharge IGBTM1 and the discharge resistor R1 can be adequately protected.

Figure 5:
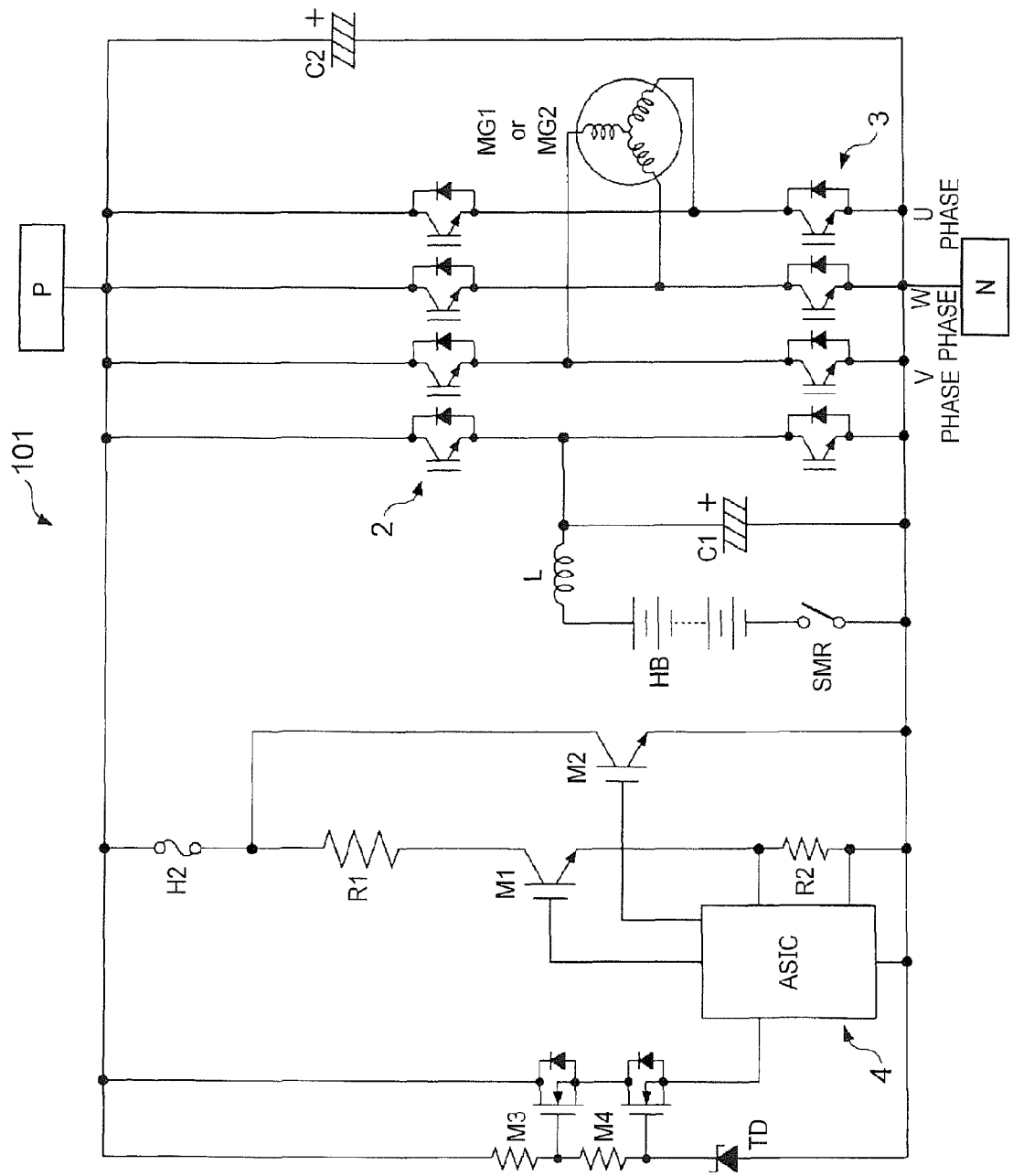
FIG. 5 is a schematic diagram illustrating the circuit configuration of the overcurrent protection device 101 of a comparative example.

FIG. 5 shows a circuit configuration using an IGBTM2 for fuse disconnection in addition to the above-described discharge IGBTM1. In the case of the circuit configuration shown in FIG. 5, a separate IGBT is necessary and the number of parts is increased. Furthermore, there is a possibility that a large current flows and the melted material is scattered because a fuse H2, which is not of a surface mounting type, is directly grounded.

By contrast, in the present example, the above-mentioned small leak current flows when the fuse H1 is melted. Therefore, the fuse H1 can be prevented from scattering and causing a variety of problems after melting. Further, even when the fuse H1 is heated, since the application of power to the power supply components M3, M4 is increased gradually, the surrounding temperature T2 can be reached slower. Therefore, rapid melting of the fuse H1 can be prevented, and scattering after melting can be also prevented.

Further, in the configuration shown in FIG. 5, the discharge IGBTM1 can be controlled by a pulse discharge system and a control system that does not use the duty ratio control by pulse width modulation (PWM). With the former control system, a loss in the discharge resistor R1 can be inhibited by the duty ratio control even when an ON failure occurs, but a pulse drive is needed for the discharge IGBTM1. The resultant demerit is that charging and discharging are repeated with respect to the IGBT gate capacity and current consumption is increased.

When the current in the main circuit is large, current consumption can be reduced by using the later control system that does not use the duty ratio control. However, when the latter control system is used, a high discharge resistor R1 should be set in order to prevent the discharge IGBTM1 or the fuse H2 from blowing even when continuous energizing is performed. Therefore, it can be impossible to ensure the current that blows the fuse H2 even when an ON failure occurs. In such a case, it is necessary to switch OFF the system main relay SMR in order to inhibit the loss in the discharge resistor R1, and evacuation running is difficult. By contrast, in the present example, the control of the discharge IGBTM1 is unnecessary when the fuse H1 is blown. Therefore, it is also not necessary to switch OFF the system main relay SMR by taking into account the increase in the loss in the discharge resistor R1. As a result, the possibility of the evacuation running becoming difficult can be avoided.

Further, in the present example, the ASIC 4 also includes the notification unit 4*d* that, after the fuse H1 has blown, notifies the MGECU of the effect that the fuse is blown and the discharge is impossible. Therefore, the user of the vehicle can be notified of the blown fuse H1 faster than via a display connected to the MGECU, and the user can be prompted to ask a dealer to repair the failure.

Further, the amount of heat generated by the ASIC 4 can be also inhibited by adequately setting the voltage of the ASIC 4 on the grounding side of the above-described switch SW1 for heat generation control, the resistance R3 for heat generation control, and the transfer ratio Y.

Furthermore, since the power supply components M3, M4 and the fuse H1 are disposed as shown in FIGS. 2A and 2B on the control substrate 6 on which the ASIC 4 is to be mounted, the transfer ratio Y can be easily set by adjusting the distance of the power supply components M3, M4 from the fuse H1 or by setting the thermal conductivity of the copper wiring 9. The heat transfer efficiency may be increased by setting a higher value of the transfer ratio Y. As a result, the amount of heat generated by the power supply components M3, M4 is minimized, the protection of the power supply components M3, M4 can be ensured, and functional efficiency of the overcurrent protection device 1 can be increased.

An example of the invention is explained in detail above, but the invention is not limited to the above-described example and various changes and substitutions may be added thereto.

Figure 6:
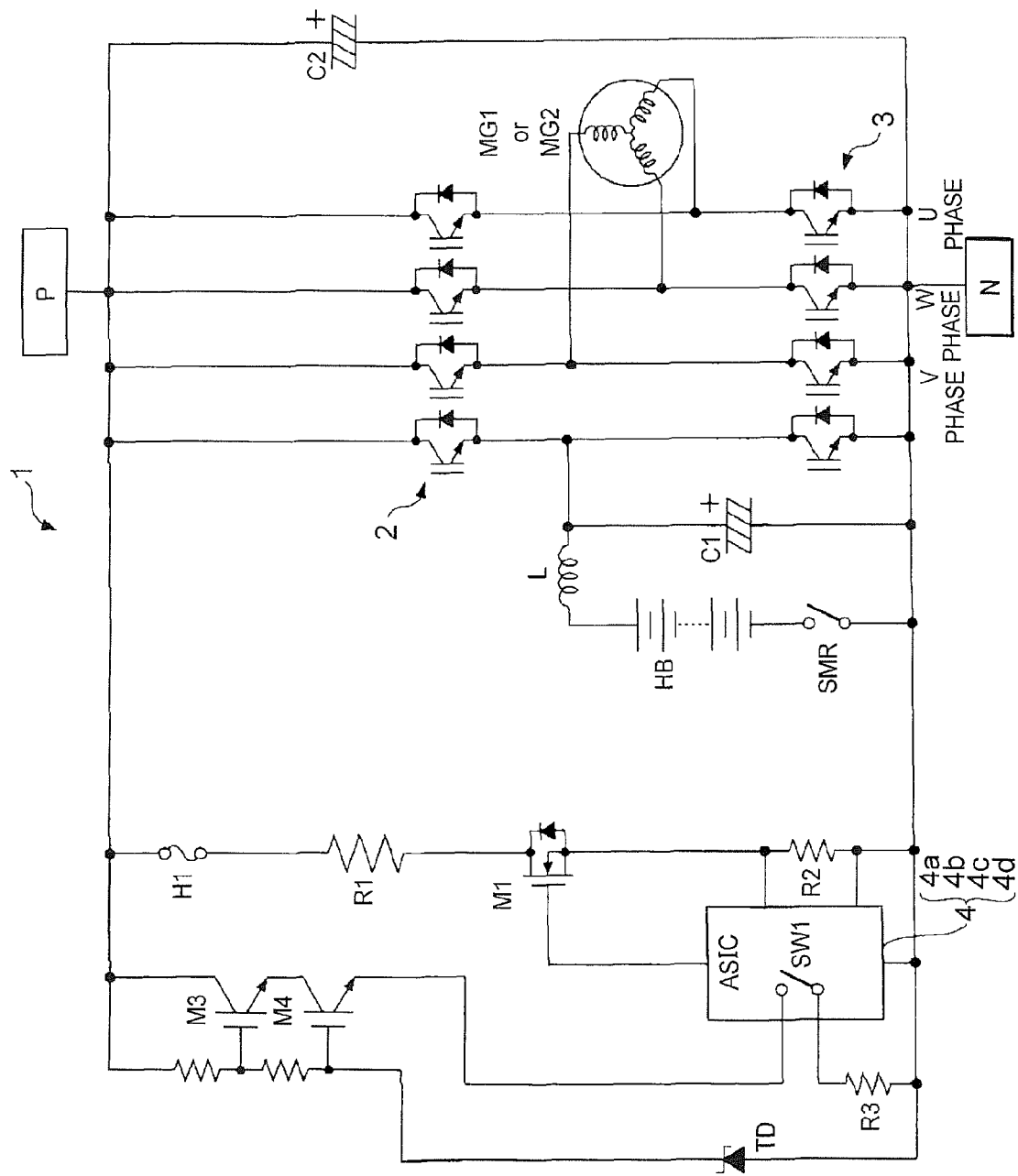
FIG. 6 is a schematic diagram illustrating another embodiment of the overcurrent protection device 1 of the example.

For example, in the example, the discharge IGBTM1 is used as the discharge unit, but it may be substituted with a discharge metal oxide semiconductor (MOS), as shown in FIG. 6. Further, the power supply components M3, M4 are field effect transistors (FETs) in the example, but an IGBT may be also used as shown in FIG. 6. In this case, as shown in parentheses in FIG. 2B, the collector C is replaced with the drain D, and the emitter E is replaced with the source S.

The invention relates to an overcurrent protection device which controls the discharge of the main circuit having a high-voltage unit in hybrid vehicles or electric automobiles. The invention makes it possible to protect a discharge component or a discharge resistors by causing the fuse to blow on the basis of power application to the power supply component, without providing a separate discharge component, even when a leak current has occurred in the discharge component. Therefore, the invention may be applied to various abovementioned automobiles.

What is claimed is:

1. An overcurrent protection device comprising:
    a fuse element to which power is applied from a high-voltage unit of a main circuit; and
    an auxiliary circuit including a component which heats the fuse element, the component is constituted by a first component and a second component adjacent to each other, and the fuse element is disposed between the first component and the second component;
    a control substance having a surface where the first component, the second component, and the fuse element are provided; and
    a heat transfer plate provided in the control substrate and thermally connecting surfaces of the first component, the second component, and the fuse element that face the surface of the control substrate,
    wherein an amount of electric current flowing in the fuse element when the fuse element melts is controlled by heat generated by the component.

2. The overcurrent protection device according to claim 1, wherein
    the heat transfer plate is a connection plate that electrically connects the first component and the second component to each other.

3. An overcurrent protection device comprising:
    a fuse element to which power is applied from a high-voltage unit of a main circuit; and
    an auxiliary circuit including a component which heats the fuse element, the component is constituted by a first component and a second component adjacent to each other, and the fuse element is disposed between the first component and the second component,
    wherein an amount of electric current flowing in the fuse element when the fuse element melts is controlled by heat generated by the component,
    the first component is electrically connected to a high-voltage side of the main circuit, and
    the fuse element is disposed between an emitter of the first component and a collector of the second component in a plane parallel to the surface of the control substrate.

4. An overcurrent protection device comprising:
    a discharge unit that discharges electric charges of a high-voltage unit of a main circuit;
    a detection unit that detects an energizing current of the discharge unit;
    a first control unit that controls the discharge unit;
    a power supply circuit including a power supply component that supplies power to the first control unit on a basis of power from the high-voltage unit;

a fuse element to which power is applied from the high-voltage unit of the discharge unit; and an application unit that performs an application of the power from the high-voltage unit between main terminals of the power supply component so as to heat the fuse element in the case where the detection unit detects the energizing current when the first control unit maintains OFF control of the discharge unit.

5. The overcurrent protection device according to claim 4, wherein the application unit is configured to gradually increase an amount of the application.

6. The overcurrent protection device according to claim 5, wherein the application unit is configured to stop the application when the detection unit does not detect the energizing current after the application unit has performed the application.

7. The overcurrent protection device according to claim 6, further comprising:

a notification unit that, when the application performed by the application unit is stopped, notifies a second control unit of information including occurrence of melting of the fuse element caused by the application, the second control unit being configured to notify a user of melting of the fuse element.

8. The overcurrent protection device according to claim 7, further comprising:

a control substrate having a surface on which the power supply component and the fuse element are adjacently mounted, wherein the first control unit, the detection unit, and the application unit constitute a single integrated circuit, and the integrated circuit is mounted on the control substrate.

9. The overcurrent protection device according to claim 8, wherein the power supply component is constituted by a first component and a second component adjacent to each other, and the fuse element is disposed between the first component and the second component.

10. The overcurrent protection device according to claim 5, further comprising:

a control substrate having a surface on which the power supply component and the fuse element are adjacently mounted; and a heat transfer plate provided in the control substrate and thermally connecting surfaces of the power supply component and the fuse element that face the surface of the control substrate.

11. The overcurrent protection device according to claim 10, wherein the power supply component is constituted by a first component and a second component that are adjacent to each other, and the heat transfer plate is a connection plate that electrically connects the first component and the second component to each other.

12. An overcurrent protection method comprising:

a detection step of detecting an energizing current in a discharge resistor when a control unit stops discharge to the discharge resistor, the control unit controlling discharge of electric charges of a high-voltage unit of a main circuit; and an application step of, when the energizing current has been detected in the detection step, heating a fuse element disposed at a high-voltage side of the discharge resistor by performing an application of power from the high-voltage unit between main terminals of a power supply component, the power supply component supplying power to the control unit on a basis of power from the high-voltage unit.

13. The overcurrent protection method according to claim 12, wherein an amount of the application is gradually increased in the application step.

14. The overcurrent protection method according to claim 13, further comprising:

an application stop step of stopping the application of power from the high-voltage unit between the main terminals of the power supply component when the energizing current is not detected in the application step.

15. A non-transitory medium storing a program for executing the overcurrent protection method according to claim 12.

* * * * *